(12) United States Patent
Cao et al.

(10) Patent No.: US 11,909,738 B2
(45) Date of Patent: Feb. 20, 2024

(54) NETWORK ACCESS CONTROL METHOD AND DEVICE

(71) Applicant: Huawei Technologies Co., Ltd., Shenzhen (CN)

(72) Inventors: Jingyun Cao, Hangzhou (CN); Huazhi Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 430 days.

(21) Appl. No.: 17/316,388

(22) Filed: May 10, 2021

(65) Prior Publication Data

US 2021/0266327 A1 Aug. 26, 2021

Related U.S. Application Data

(63) Continuation of application No. PCT/CN2020/086361, filed on Apr. 23, 2020.

(30) Foreign Application Priority Data

Apr. 29, 2019 (CN) .......................... 201910354917.4

(51) Int. Cl.
*G06F 21/00* (2013.01)
*H04L 9/40* (2022.01)
(Continued)

(52) U.S. Cl.
CPC ............ *H04L 63/102* (2013.01); *H04L 45/74* (2013.01); *H04L 61/4511* (2022.05); *H04L 61/5007* (2022.05); *H04L 63/0876* (2013.01)

(58) Field of Classification Search
CPC . H04L 63/0876; H04L 45/74; H04L 61/4511; H04L 61/5007; H04L 63/102
(Continued)

(56) References Cited

U.S. PATENT DOCUMENTS 6,876,654 B1* 4/2005 Hegde ................. H04L 12/4625
370/466
2012/0144483 A1* 6/2012 Song ................... H04L 63/1458
726/22
(Continued)

FOREIGN PATENT DOCUMENTS

CN 103650437 A 3/2014
CN 104506538 A 4/2015
(Continued)

OTHER PUBLICATIONS

"Protocol Standard for A NetBIOS Service on a TCP/UDP Transport: Concepts and Methods", Network Working Group; Request for Comments: 1001, Mar. 1987, 68 pages.
(Continued)

*Primary Examiner* — Josnel Jeudy
(74) *Attorney, Agent, or Firm* — Slater Matsil, LLP

(57) ABSTRACT

This application provides a network access control method. Before a second device accesses a target to-be-accessed device in an internal network, authentication is first performed on the second device by using a local domain name carried in a domain name request packet. Only when the local domain name is authenticated, an IP address of the second device and an IP address of the target device to be accessed by the second device are recorded in forwarding information. Therefore, when a data request packet is received, it may be determined, based on a source IP address, a destination IP address, and the forwarding information that are carried in the data request packet, whether to forward the data request packet.

20 Claims, 4 Drawing Sheets

(51) Int. Cl.
  *H04L 45/74* (2022.01)
  *H04L 61/4511* (2022.01)
  *H04L 61/5007* (2022.01)

(58) Field of Classification Search
  USPC .............................................................. 726/7
  See application file for complete search history.

(56) References Cited

U.S. PATENT DOCUMENTS

| | | | |
|---|---|---|---|
| 2013/0089093 A1* | 4/2013 | Bacthu | H04L 45/64 370/390 |
| 2015/0358276 A1 | 12/2015 | Liu et al. | |
| 2016/0072766 A1 | 3/2016 | Jain et al. | |
| 2017/0149730 A1 | 5/2017 | Baughman et al. | |
| 2017/0237706 A1 | 8/2017 | Wei | |
| 2019/0132322 A1* | 5/2019 | Song | H04L 63/101 |

FOREIGN PATENT DOCUMENTS

| | | | | |
|---|---|---|---|---|
| CN | 105323173 A | | 2/2016 | |
| CN | 105338123 A | | 2/2016 | |
| CN | 105516385 A | | 4/2016 | |
| CN | 105610993 A | | 5/2016 | |
| CN | 105681225 | * | 6/2016 | ............ H04L 47/70 |
| CN | 107819732 A | | 3/2018 | |
| CN | 107980217 A | | 5/2018 | |
| CN | 108337257 A | | 7/2018 | |
| IN | 104601578 A | | 5/2015 | |

OTHER PUBLICATIONS

"Protocol Standard for A NetBIOS Service on a TCP/UDP Transport:Detailed Specifications, Network Working Group", Request for Comments: 1002, Mar. 1987, 85 pages.

* cited by examiner

NETWORK ACCESS CONTROL METHOD AND DEVICE

CROSS-REFERENCE TO RELATED APPLICATIONS

This application is a continuation of International Application No. PCT/CN2020/086361, filed on Apr. 23, 2020, which claims priority to Chinese Patent Application No. 201910354917.4, filed on Apr. 29, 2019. The disclosures of the aforementioned applications are hereby incorporated by reference in their entireties.

TECHNICAL FIELD

This application relates to the field of information technologies, and in particular, to a network access control method and a device.

BACKGROUND

With development of a network, security of a local area network, such as an internal network in an enterprise, a government department, or a campus, is facing more and more challenges. Even though a powerful boundary device is deployed at a boundary between a local area network and the internet (Internet), the boundary device may still be cracked into. Once the boundary device is cracked into, an internal network protected by the boundary device becomes insecure. A worm virus may spread in the internal network, and a hacker may control a host in the internal network. This threatens the security of the local area network.

An existing study proposes to set a honeypot system in an internal network. When a hacker tries to access the internal network, the honeypot system discovers the access behavior of the hacker, and obtains information of a worm virus. However, this technology only passively waits for a hacker and a worm virus to access the honeypot system, and leave an access trace. Therefore, there is a low probability that the honeypot system discovers that a hacker and a worm virus exist in the internal network, and the honeypot system cannot prevent the worm virus from spreading in the internal network.

SUMMARY

This application provides a network access control method, and the method can reduce a security threat to an internal network.

According to a first aspect, a network access control method is provided. The method may be performed by a first device in an internal network, and the first device may be a forwarding device in the internal network. The method includes: receiving a first domain name request packet sent by a second device, where the first domain name request packet carries a source internet protocol (IP) address and a first local domain name, and the first local domain name is used to indicate a device other than the second device in the internal network; determining whether the first local domain name is authenticated; if the first local domain name is authenticated, generating an entry of forwarding information, where the entry includes an address pair including the source IP address and a first IP address corresponding to the first local domain name; receiving a data request packet sent by the second device, where the data request packet carries the source IP address and a destination IP address; and determining, based on the source IP address, the destination IP address, and the forwarding information, whether to forward the data request packet, where the data request packet is used to access the internal network.

Based on the foregoing technical solution, a local domain name is generated for a computer in the internal network, and when receiving a domain name request packet from the computer in the internal network, a switch determines whether the local domain name carried in the domain name request packet is authenticated. Only when the local domain name is authenticated, the switch records an IP address of the computer and an IP address of a target device to be accessed by the computer in the forwarding information. When receiving a data request packet subsequently, the switch may determine, based on a source IP address, a destination IP address, and the forwarding information that are carried in the data request packet, whether to forward the data request packet. For example, the switch forwards the data request packet to the target device when the forwarding information records the source IP address and the destination IP address that are carried in the data request packet. This reduces a security threat to the internal network.

In a possible implementation, the determining whether the first local domain name is authenticated includes: determining whether a structure of a character string of the first local domain name meets a preset naming rule; and if the structure of the character string of the first local domain name meets the preset naming rule, determining that the first local domain name is authenticated.

Based on the foregoing technical solution, a local domain name is generated for a computer in the internal network, a structure of a character string of the local domain name generated for the computer in the internal network is enabled to meet the preset naming rule, and when authentication is performed on the second device, it is determined whether the structure of the character string of the local domain name meets the preset naming rule, to determine whether the second device is authenticated. For example, when the structure of the character string of the first local domain name meets the preset naming rule, it is determined that the second device is authenticated. Then an IP address of the second device and an IP address of a target device to be accessed by the second device are recorded in the forwarding information. In this way, when the data request packet is received, it may be determined, based on the source IP address, the destination IP address, and the forwarding information, whether to forward the data request packet. This reduces a security threat to the internal network.

In a possible implementation, the first IP address is truncated from the character string of the first local domain name according to the preset naming rule.

Based on the foregoing technical solution, the first IP address is carried in the first local domain name, and when the first device determines that the second device is authenticated, the first IP address may be obtained from the first local domain name, and the IP address of the second device and the first IP address are recorded in the forwarding information. In this way, when the data request packet is received, it may be determined, based on the source IP address, the destination IP address, and the forwarding information, whether to forward the data request packet. This reduces a security threat to the internal network.

In a possible implementation, the determining whether the first local domain name is authenticated includes: determining whether stored reference information includes the first local domain name, where the reference information includes a plurality of local domain names and a plurality of IP addresses, and the plurality of local domain names and the plurality of IP addresses are in a one-to-one correspondence; and if the reference information includes the first local domain name, determining that the first local domain name is authenticated, where the first IP address is an IP address that is in the reference information and that is corresponding to the first local domain name.

Based on the foregoing technical solution, the reference information is prestored on the first device, and the reference information includes a plurality of IP addresses of computers in the internal network and local domain names generated for the computers in the internal network, so that after obtaining the local domain name carried in the domain name request packet, the first device may check whether the reference information includes the local domain name. When the reference information includes the local domain name, it is determined that the second device is authenticated, an IP address that is in the reference information and that is corresponding to the local domain name is determined as the first IP address, and the IP address of the second device and the first IP address are recorded in the forwarding information. In this way, when the data request packet is received, it may be determined, based on the source IP address, the destination IP address, and the forwarding information, whether to forward the data request packet. This reduces a security threat to the internal network.

In a possible implementation, if it is determined that first local domain name is authenticated, the method further includes: generating a first domain name request response packet, where the first domain name request response packet carries the first IP address; and sending the first domain name request response packet to the second device.

In a possible implementation, each entry of the forwarding information further includes time duration information, the time duration information is used to indicate a valid time duration of the entry, and the method further includes: for each entry, determining whether a current time duration is greater than a valid time duration corresponding to the address pair, where a timing start moment of the current time duration is a time of generating the entry; and if the current time duration is greater than the valid time duration corresponding to the address pair, deleting the entry.

Based on the foregoing technical solution, a valid time duration corresponding to each entry is recorded in the forwarding information, so that the first device may manage, based on the valid time duration corresponding to each entry, the entry recorded in the forwarding information. For example, if the current time duration is greater than the valid time duration corresponding to the entry, the entry in the forwarding information is deleted.

In a possible implementation, the determining, based on the source IP address, the destination IP address, and the forwarding information, whether to forward the data request packet includes: determining whether the forwarding information includes an address pair including the source IP address and the destination IP address; and if the forwarding information includes the address pair including the source IP address and the destination IP address, forwarding the data request packet; or if the forwarding information does not include the address pair including the source IP address and the destination IP address, sending the data request packet to a deception system in the internal network, or discarding the data request packet.

Based on the foregoing technical solution, whether to forward the data request packet is determined based on the source IP address, the destination IP address, and the forwarding information that are carried in the data request packet. For example, when the source IP address and the destination IP address that are carried in the received data request packet are recorded in the forwarding information, the data request packet is forwarded. When the source IP address and the destination IP address that are carried in the received data request packet are not recorded in the forwarding information, the data request packet is not forwarded (for example, the data request packet is sent to the deception system, or the data request packet is discarded). This reduces a security threat to the internal network.

In a possible implementation, the method further includes: receiving a second domain name request packet sent by the second device, where the second domain name request packet carries the source IP address and a domain name of an external network; and sending the second domain name request packet to a domain name resolution device.

In a possible implementation, the method further includes: receiving a second domain name request response packet returned by the domain name resolution device, where the second domain name request response packet carries an IP address of the external network; and sending the second domain name request response packet to the second device.

In a possible implementation, the method further includes: generating an entry of the forwarding information based on the domain name of the external network, where the entry includes an address pair including the source IP address and the IP address of the external network. Based on the foregoing technical solution, the IP address of the second device (for example, the source IP address) and the IP address of the external network to be accessed by the second device are recorded in the forwarding information, so that when the second device is to access the external network, and the first device receives a data access request for accessing the external network from the second network, the second device can forward the data request packet to the external network based on the IP address of the second device and the IP address of the external network that are recorded in the forwarding information. This prevents the internal network from being attacked, and ensures normal communication between the second device and the external network.

In a possible implementation, after the receiving the first domain name request packet, and before the generating an entry of the forwarding information, the method further includes: obtaining access control information, where the access control information is used to indicate an IP address of a device that requires access control; and determining, based on the access control information and the source IP address of the first domain name request packet, that the second device is the device that requires access control; and/or after the receiving the second domain name request packet, and before the generating an entry of the forwarding information, the method further includes: obtaining access control information, where the access control information is used to indicate an IP address of a device that requires access control; and determining, based on the access control information and the source IP address of the second domain name request packet, that the second device is the device that requires access control.

According to a second aspect, an embodiment of this application provides a network access control device. The device has a function of implementing the method in any one of the first aspect or the foregoing possible implementations of the first aspect. The function may be implemented by hardware, or may be implemented by hardware executing corresponding software. The hardware or the software includes one or more modules corresponding to the foregoing function.

According to a third aspect, an embodiment of this application provides a communications system. The system includes a first device and at least one second device, and any two second devices communicate with each other through the first device. The first device is configured to perform the method in any one of the first aspect or the foregoing possible implementations of the first aspect.

According to a fourth aspect, an embodiment of this application provides a computer storage medium, configured to store computer software instructions used by a first device. When the computer software instructions are run on a computer, the computer is enabled to perform the method in the foregoing aspects.

According to a fifth aspect, an embodiment of this application provides a computer program product including instructions. When the computer program product is run on a computer, the computer is enabled to perform the method in any one of the first aspect or the possible implementations of the first aspect.

DETAILED DESCRIPTION OF ILLUSTRATIVE EMBODIMENTS

The following describes technical solutions in the embodiments of this application with reference to the accompanying drawings. A network system and a service scenario described in the embodiments of this application are intended to describe the technical solutions in the embodiments of this application more clearly, and do not constitute a limitation on the technical solutions provided in the embodiments of this application. A person of ordinary skill in the art may learn that, with evolution of the network system and emergence of a new service scenario, the technical solutions provided in the embodiments of this application are also applicable to similar technical problems.

Ordinal numbers such as "1", "2", "3", "first", "second", and "third" in this application are used to distinguish between a plurality of objects, but are not used to limit a sequence of the plurality of objects.

Figure 1:
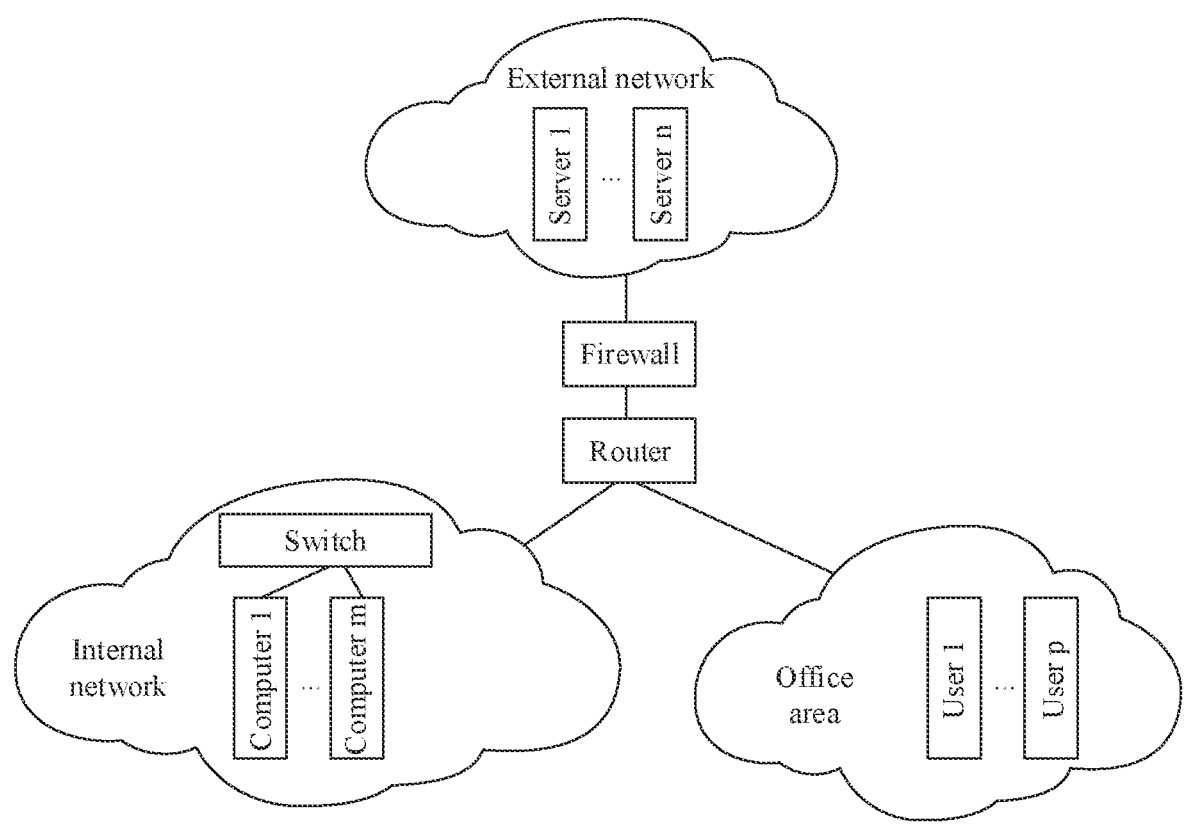
FIG. 1 is a schematic diagram of a network system applicable to an embodiment of this application.

The following describes an application scenario in the embodiments of this application with reference to FIG. 1. A network system shown in FIG. 1 includes an external network (for example, the internet), an internal network, and an office area. The office area separately communicates with the external network and the internal network through a router. A firewall is used to protect the internal network from being attacked by the external network.

The external network includes n (n is greater than or equal to 2) servers. One server in the n servers in the external network (referred to as an "external server" below) is used as a domain name system (DNS) server, and another server may be a web server, an instant messaging server, or the like.

The internal network includes m (m is greater than or equal to 2) computers, and m computers in the internal network (referred to as "internal network computers" below) may access each other. In addition, the internal network computer may further access the external network.

Currently, with development of a network, security of a local area network, such as an internal network in an enterprise, a government department, or a campus, is facing more and more challenges. Even though a powerful boundary device is deployed at a boundary between a local area network and the internet, the boundary device may still be cracked into. Once the boundary device is cracked into, an internal network protected by the boundary device becomes insecure. A worm virus may spread in the internal network, and a hacker may control a host in the internal network. This threatens the security of the local area network.

In view of this, this application provides a network access control method. In the method, a local domain name is generated for a computer in an internal network. When receiving a domain name request packet from an internal network computer, a switch determines whether the local domain name carried in the domain name request packet is authenticated. Only when the local domain name is authenticated, the switch records an internet protocol (IP) address of the computer and an IP address of a target device to be accessed by the computer in forwarding information. When receiving a data request packet subsequently, the switch may determine, based on a source IP address, a destination IP address, and the forwarding information that are carried in the data request packet, whether to forward the data request packet. For example, the switch forwards the data request packet to the target device when the forwarding information records the source IP address and the destination IP address that are carried in the data request packet. This reduces a security threat to the internal network.

It should be noted that, in this application, when an internal network computer accesses an internal network, a domain name carried in a domain name request packet sent by the internal network computer is a local domain name of another internal network computer to be accessed by the internal network computer. After determining that the local domain name is authenticated, the switch may resolve the local domain name according to a multicast domain name system (multicast DNS, mDNS) protocol or a link-local multicast name resolution (LLMNR) protocol, to obtain an IP address of the another internal network computer, and return, to the internal network computer, a domain name request response packet carrying the IP address. When the internal network computer accesses an external network, a domain name carried in a domain name request packet sent by the internal network computer is a domain name of the external network to be accessed by the internal network computer. After determining that the domain name of the external network is not a local domain name, the switch may forward the domain name request packet to a domain name system (DNS) server. The DNS server resolves the domain name of the external network according to a DNS protocol, to obtain an IP address of the external network, and returns, to the internal network computer, a domain name request response packet carrying the IP address.

The DNS protocol is used to implement a mapping between an IP address of a public network (the public network is relative to the internal network) and the domain name of the external network. The MDNS and LLMNR are used to implement a mapping between a local domain name and an IP address of the internal network.

Figure 2:
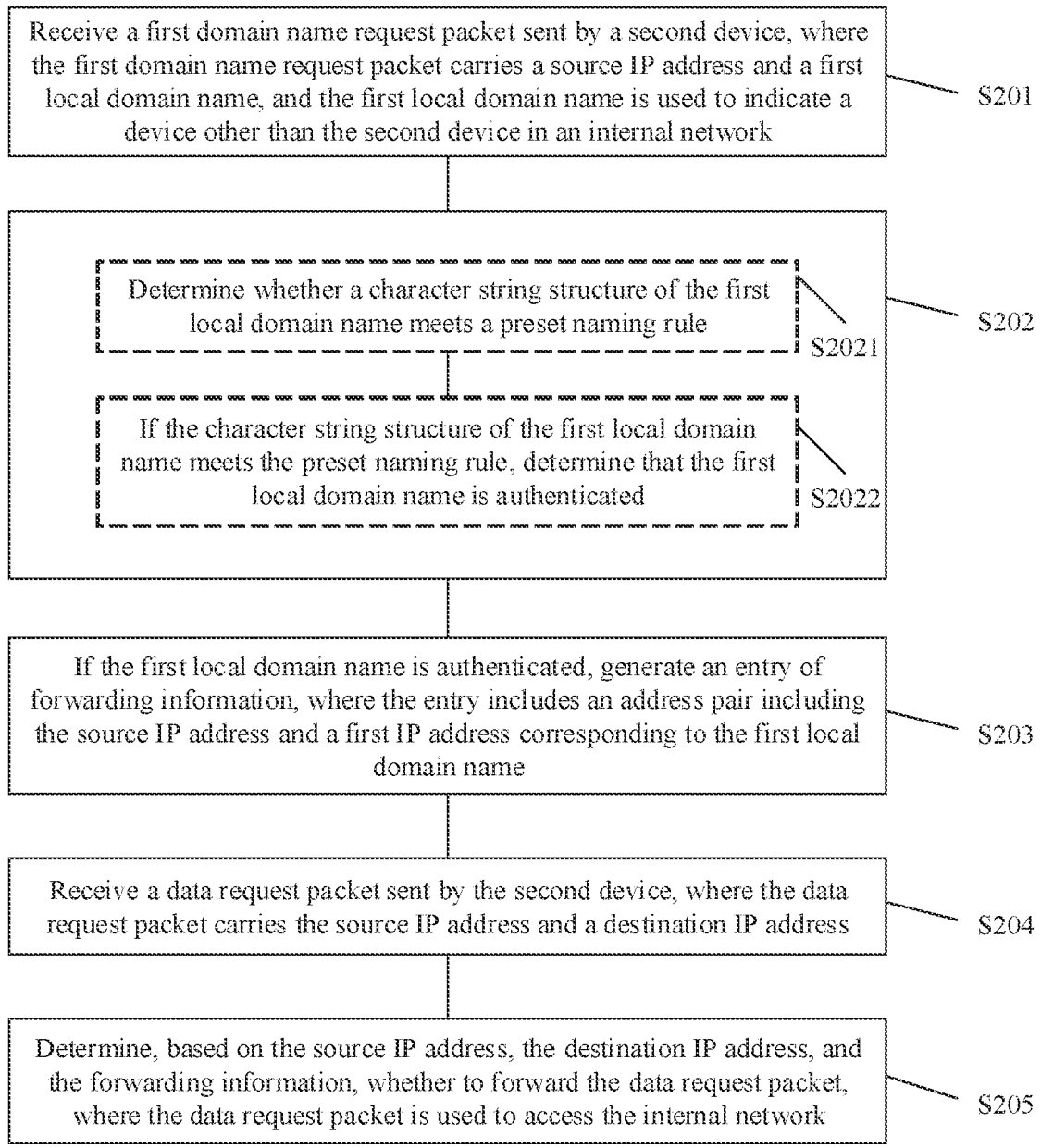
FIG. 2 is a schematic flowchart of a network access control method according to an embodiment of this application.

The following describes in detail a network access control method 200 provided in an embodiment of this application. FIG. 2 is a schematic flowchart of the method 200, and the method may be applied to the network system shown in FIG. 1.

S201: A first device receives a first domain name request packet sent by a second device. The first domain name request packet carries a source IP address and a first local domain name, and the first local domain name is used to indicate a device other than the second device in an internal network. The first device may be a forwarding device in the internal network.

S202: The first device determines whether the first local domain name is authenticated.

S203: If the first local domain name is authenticated, the first device generates an entry of forwarding information. The entry includes an address pair including the source IP address and a first IP address corresponding to the first local domain name.

S204: The first device receives a data request packet sent by the second device. The data request packet carries the source IP address and a destination IP address.

S205: The first device determines, based on the source IP address, the destination IP address, and the forwarding information, whether to forward the data request packet. The data request packet is used to access the internal network.

Specifically, in S201, before an internal network computer accesses data (for example, an internal network computer 1 (for example, the second device) needs to access data on an internal network computer 4), the internal network computer 1 may send a domain name request packet (for example, the first domain name request packet) to a DNS server through the first device (for example, a switch). The first domain name request packet carries an IP address of the internal network computer 1 (for example, the source IP address) and a local domain name (for example, the first local domain name) assigned to the internal network computer 4. The first local domain name may indicate a device (for example, the internal network computer 4) other than the second device in the internal network.

In this embodiment of this application, a local domain name is configured for an internal network computer. Authentication is performed, by using the local domain name carried in a domain name request packet, on the internal network computer that sends the domain name request packet. For example, in S202, when receiving the first domain name request packet sent by the internal network computer 1, the switch may determine whether the first local domain name carried in the first domain name request packet is authenticated. In other words, whether the internal network computer 1 is secure is determined by determining whether the first local domain name is authenticated. In S203, if the switch determines that the first local domain name carried in the first domain name request packet is authenticated, the switch records the IP address of the internal network computer 1 and the first IP address corresponding to the first local domain name in the entry of the forwarding information. The first IP address corresponding to the first local domain name may be an IP address of a target device (for example, the internal network computer 4) to be accessed by the internal network computer 1.

For example, S202 may include the following steps.

S2021: When determining whether the first local domain name is authenticated, the internal network computer 1 may determine whether a structure of a character string of the first local domain name meets a preset naming rule.

S2022: If the structure of the character string of the first local domain name meets the preset naming rule, the internal network computer 1 may determine that the first local domain name is authenticated.

For example, a form of a local domain name that is limited by the preset naming rule may be shown as follows:
  Rule 1: IP address+suffix character string;
  Rule 2: Prefix character string+IP address;
  Rule 3: Prefix character string+IP address+suffix character string;
  Rule 4: '.' of the IP address is replaced with '-';
  Rule 5: IP address+suffix character string, where '.' is replaced with '-' of the IP address;
  Rule 6: Prefix character string+IP address, where '.' is replaced with '-' of the IP address; and
  Rule 7: Prefix character string+IP address+suffix character string, where '.' is replaced with '-' of the IP address.

For example, when the IP address is 10.1.1.3, and the foregoing naming rule specifies that the prefix character string is "abc", and the suffix character string is "com", a form of a local domain name that meets the foregoing naming rule may be shown as follows:
  Rule 1: 10.1.1.3.com;
  Rule 2: abc.10.1.1.3;
  Rule 3: abc.10.1.1.3.com;
  Rule 4: 10-1-1-3;
  Rule 5: 10-1-1-3-com;
  Rule 6: abc-10-1-1-3; and
  Rule 7: abc-10-1-1-3-com.

When receiving the first domain name request packet, the switch may determine whether the structure of the character string of the first local domain name meets any one preset rule in the foregoing rule 1 to rule 7. If the structure of the character string of the first local domain name meets any one preset rule in the rule 1 to rule 7, the switch may determine that the first local domain name is authenticated, that is, the switch may determine that a sender (for example, the internal network computer 1) of the first domain name request packet is secure. In this case, in S203, the switch may record the source IP address carried in the first domain name request packet and the first IP address corresponding to the first local domain name in the entry of the forwarding information, so that the forwarding information includes the address pair including the source IP address and the first IP address.

The first IP address corresponding to the first local domain name is an IP address that may be carried in the first local domain name according to the foregoing naming rule. For example, if the first local domain name carried in the first domain name request packet received by the switch from the internal network computer 1 is abc.10.1.1.3, the IP address 10.1.1.3 in the first local domain name is the first IP address. If the switch determines that the structure of the character string of the first local domain name meets the preset naming rule, the source IP address carried in the first domain name request packet and the first IP address carried in the first local domain name may be recorded in an entry of the forwarding information.

When determining that the structure of the character string of the first local domain name meets the preset rule, in addition to recording the source IP address carried in the first domain name request packet and the first IP address carried in the first local domain name in the entry of the forwarding information, the switch may further generate time duration information for each entry. Each piece of time duration information is used to indicate a valid time duration of a corresponding entry. The switch may record the time duration information of each entry in the entry, so that a correspondence exists between each entry and the time duration information corresponding to the entry. For example, when the forwarding information is an access control list, in order that a correspondence exists between each entry and the time duration information corresponding to the entry, each entry and the time duration information corresponding to the entry may be recorded in a same row or a same column of the access control list.

For example, if a local domain name carried in another domain name request packet received by the switch is 10.1.1.3, and the switch determines that a structure of a character string of the local domain name does not meet the preset naming rule, it is considered that the local domain name is not authenticated. In this case, the switch does not add an entry corresponding to the another domain name request packet to the forwarding information.

For each entry of the forwarding information, when the entry includes time duration information, the method 200 may further include: The switch determines whether a current time duration is greater than a valid time duration corresponding to the entry, where a timing start moment of the current time duration is a time of generating the entry; and if the current time duration is greater than the valid time duration corresponding to the entry, deletes the entry.

Specifically, the switch may manage, based on the time duration information included in the forwarding information, the entry recorded in the forwarding information.

For example, the switch may compare the current time duration with the valid time duration corresponding to the entry. The timing start moment of the current time duration is the time of generating the entry. For example, when adding an entry to the forwarding information, the switch may control a timer to start. After the timer starts, a current time duration is recorded.

If the current time duration is greater than the valid time duration corresponding to the entry, the switch may consider that the entry has expired. In this case, the switch may delete the expired entry recorded in the forwarding information, to manage the entry recorded in the forwarding information.

For example, in S204, the internal network computer 1 in the internal network needs to access data on the internal network computer 4. In this case, the internal network computer 1 may send a data request packet to the internal network computer 4, where the data request packet carries a source IP address and a destination IP address. The source IP address may be the IP address of the internal network computer 1, and the destination IP address may be the IP address of the internal network computer 4.

After the data request packet is sent by the internal network computer 1, the data request packet first arrives at the switch. After receiving the data request packet, the switch needs to further determine whether communication between the internal network computer 1 and the internal network computer 4 is allowed. Only when the communication between the internal network computer 1 and the internal network computer 4 is allowed, the switch forwards the data request packet to the internal network computer 4.

In S205, when determining whether the communication between the internal network computer 1 and the internal network computer 4 is allowed, the switch may determine, based on the source IP address, the destination IP address, and the forwarding information generated in S203 that are carried in the data request packet, whether to forward the data request packet.

For example, the forwarding information may be a list (for example, the access control list) locally generated by the switch, and at least one entry is recorded in the list. Only when the forwarding information includes an address pair including the source IP address and the destination IP address, the switch may determine that the communication between the internal network computer 1 and the internal network computer 4 is allowed. In this case, the switch forwards the data request packet to the internal network computer 4.

If the address pair including the source IP address and the destination IP address that are carried in the data request packet that arrives at the switch is not recorded in the forwarding information, a forwarding node may consider that the data request packet may be a packet forged by a network intruder (for example, a virus). In this case, the switch may send the data request packet to a deception system, or directly discard the data request packet.

For example, the source IP address and the destination IP address that are carried in the data request packet that is received by the switch are not recorded in the forwarding information. The source IP address may be an IP address of a sender of the data request packet, and the destination IP address may be an IP address of a target device of the data request packet.

The forwarding node may consider that the data request packet may be a packet forged by a network intruder (for example, a virus). In this case, the switch may determine tunnel encapsulation information for the data request packet based on locally generated encapsulation information. The tunnel encapsulation information includes at least one address pair and at least one piece of tunnel encapsulation information, and the at least one address pair and the at least one piece of tunnel encapsulation information are in a one-to-one correspondence. The switch may encapsulate the data request packet by using tunnel encapsulation information that is in the encapsulation information and that is corresponding to the address pair including the source IP address and the destination IP address, and send an encapsulated data request packet to the deception system.

For example, after the first device (for example, the switch) receives the domain name request packet (for example, the first domain name request packet), and before the first device generates the entry of the forwarding information, the method 200 may further include: The switch obtains access control information, where the access control information is used to indicate an IP address of a device that requires access control. The switch determines, based on the access control information and the source IP address of the received domain name request packet, that the second device (for example, the internal network computer 1) is the device that requires access control.

Specifically, after receiving the domain name request packet, the switch may first check the access control information, where the access control information records the IP address of the device that requires access control. For example, the access control information records a range of the IP address of the device that requires access control. After receiving the domain name request packet, and before performing authentication on the local domain name carried in the domain name request packet, the switch may first check the access control information, to determine whether the source IP address carried in the domain name request packet falls within a range, recorded in the access control information, of the source IP address. If the source IP address carried in the domain name request packet falls within the range, recorded in the access control information, of the source IP address, the switch needs to further determine whether the local domain name carried in the domain name request packet is authenticated. If the source IP address carried in the domain name request packet does not fall within the range, recorded in the access control information, of the source IP address, the switch only forwards the domain name request packet.

For example, when determining that the first local domain name carried in the first domain name request packet is authenticated, the switch may return the first IP address corresponding to the first local domain name to the internal network computer 1, so that the internal network computer 1 subsequently accesses data on a device whose IP address is the first IP address. In addition, the method 200 may further include: The first device (for example, the switch) generates a first domain name request response packet, where the first domain name request response packet carries the first IP address. The first device sends the first domain name request response packet to the second device (for example, the internal network computer 1).

For example, not all packets received by the switch may be domain name request packets. For example, a packet received by the switch may be a data request packet or a domain name request response packet. In this case, when receiving a packet (for example, a domain name request packet, a data request packet, or a domain name request response packet), the switch further needs to determine a type of the received packet (that is, the switch further needs to determine a type of the packet). Only when the switch determines that the received packet is a domain name request packet, the switch performs authentication on a sender of the domain name request packet by using a local domain name carried in the domain name request packet.

For example, the switch may determine the type of the received packet based on a protocol type carried in the packet. For example, when the protocol type carried in the packet received by the switch is the transmission control protocol (TCP), the switch may consider that the packet is a data request packet. When the protocol type carried in the packet received by the switch is the user datagram protocol (UDP), the switch may consider that the packet is a domain name request packet or a domain name request response packet.

In this case, the switch may further determine the type of the packet based on port information (for example, a port number) carried in the packet. For example, when the protocol type carried in the packet received by the switch is the UDP, if a destination port number carried in the packet is 53, the switch may consider that the packet is a domain name request packet sent to the DNS server. When the protocol type carried in the packet received by the switch is the UDP, if a source port number carried in the packet is 53, the switch may consider that the packet is a domain name request response packet from the DNS server.

It should be noted that the switch may alternatively determine the type of the packet only based on port information (for example, a port number) carried in the packet. For example, when a destination port number carried in the packet received by the switch is 53, the switch may consider that the packet is a domain name request packet sent to the DNS server. When a source port number carried in the packet received by the switch is 53, the switch may consider that the packet is a domain name request response packet from the DNS server.

For example, internal network computers may communicate with each other through the internal network, and each internal network computer may further access an external network (for example, Baidu). A data request packet sent by the internal network computer needs to be forwarded by the switch, regardless of access to the internal network or access to the external network. Based on the foregoing description of this embodiment of this application, when receiving the data request packet, the switch determines whether the forwarding information includes the source IP address and the destination IP address that are carried in the data request packet. Therefore, when the data request packet sent by the internal network computer is used to access the external network, if the forwarding information includes neither the source IP address nor the destination IP address that are carried in the data request packet, normal communication between the internal network computer and the external network is affected.

Therefore, to prevent the internal network from being attacked by a network intruder, and ensure the normal communication between the internal network computer and the external network, the forwarding information may further include an IP address of the internal network computer (for example, the source IP address) and an IP address of an external network server (for example, the destination IP address) to be accessed by the internal network computer.

For example, when the internal network computer 1 needs to access the external network, the internal network computer 1 first needs to send a domain name request packet (for example, a second domain name request packet) to a domain name resolution device (for example, the DNS server). A domain name carried in the second domain name request packet may be a domain name of the external network. For example, when the external network to be accessed by the internal network computer 1 is Baidu, the domain name carried in the second domain name request packet is www.baidu.com, and a source IP address carried in the second domain name request packet is the IP address of the internal network computer 1. The second domain name request packet is first received by the switch, and the switch may determine that the domain name carried in the second domain name request packet is not a local domain name. In this case, the switch forwards the second domain name request packet to the DNS server.

The DNS server parses the second domain name request packet, to obtain an IP address of a Baidu server (for example, the IP address of the external network) that is requested by the second domain name request packet, and generates a second domain name request response packet. The second domain name request response packet carries the IP address of the Baidu server. Finally, the DNS server sends the second domain name request response packet to the internal network computer 1 through the switch.

When receiving the IP address of the Baidu server that is returned by the DNS server, the switch records an address pair including the source IP address and the IP address of the Baidu server in an entry of the forwarding information, so that the internal network computer 1 subsequently accesses Baidu.

It should be noted that, in this embodiment of this application, when a domain name request packet arrives at the switch, if the switch determines that a domain name carried in the obtained domain name request packet is a local domain name, the switch intercepts the domain name request packet, and determines whether the local domain name is authenticated. In other words, the switch does not forward the domain name request packet to a corresponding domain name resolution device.

Figure 3:
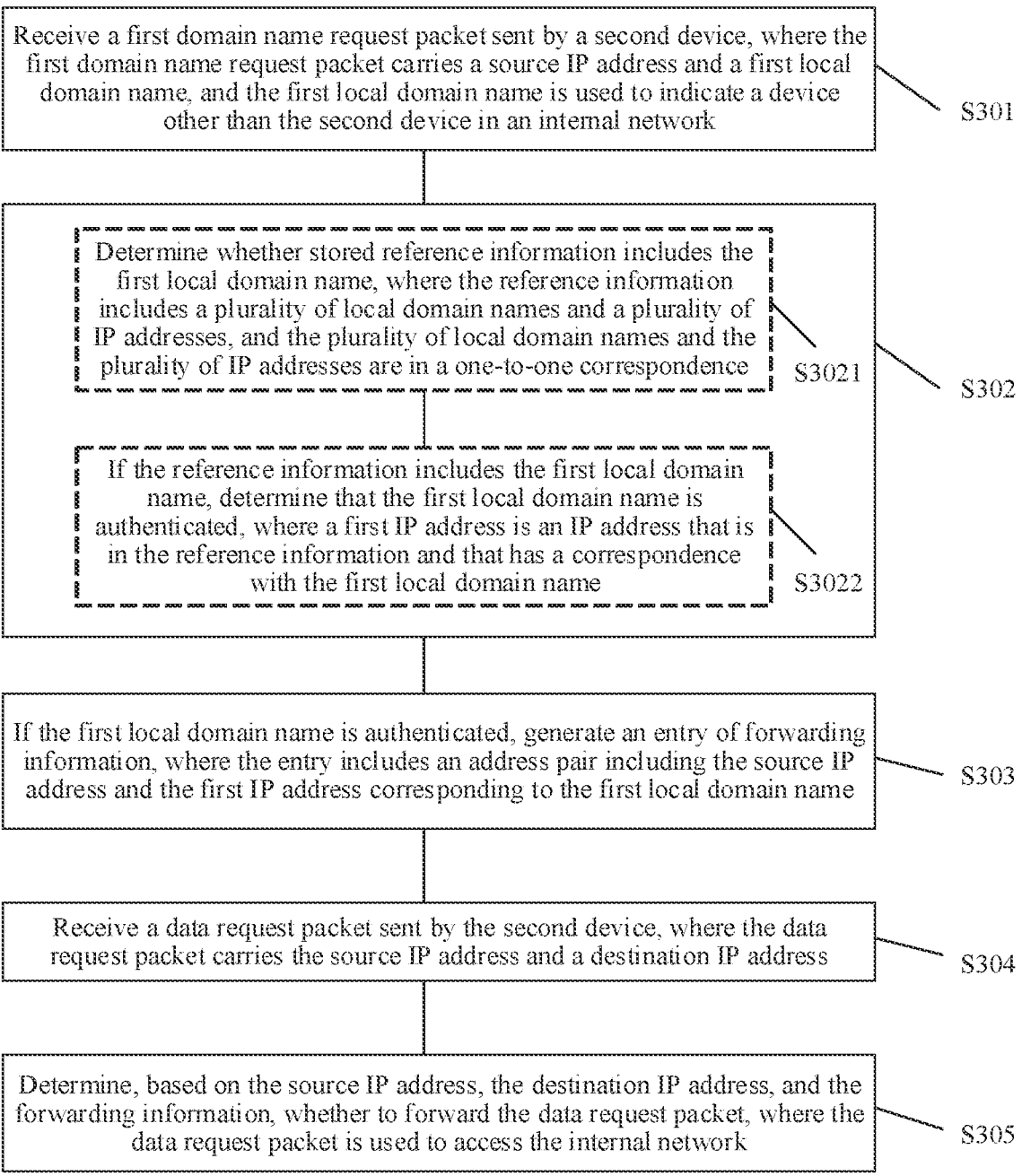
FIG. 3 is a schematic flowchart of another network access control method according to an embodiment of this application.

The following describes in detail a network access control method 300 provided in another embodiment of this application. FIG. 3 is a schematic flowchart of the method 300, and the method may be applied to the network architecture shown in FIG. 1.

The method 300 includes S301 to S305. For a specific implementation of S301, refer to S201 in the method 200. For a specific implementation of S303, refer to S203 in the method 200. For a specific implementation of S304, refer to S204 in the method 200. For a specific implementation of S305, refer to S205 in the method 200. For brevity, details are not described herein again. The following describes S302 in the method 300 in detail.

S302: A first device (for example, a switch) determines whether a first local domain name is authenticated.

For example, S302 may include the following steps.

S3021: The first device determines whether stored reference information includes the first local domain name. The reference information includes a plurality of local domain names and a plurality of IP addresses, and the plurality of local domain names and the plurality of IP addresses are in a one-to-one correspondence.

S3022: If the reference information includes the first local domain name, the first device determines that the first local domain name is authenticated. A first IP address is an IP address that is in the reference information and that is corresponding to the first local domain name.

Specifically, a first domain name request packet sent by an internal network computer 1 may carry the first local domain name and a source IP address. After receiving the first domain name request packet sent by the internal network computer 1, the switch may check whether locally generated reference information records the first local domain name. The reference information includes a plurality of local domain names and a plurality of IP addresses, and the plurality of local domain names and the plurality of IP addresses are in a one-to-one correspondence. If the reference information includes the first local domain name, the switch may determine, as the first IP address, an IP address that is in the reference information and that is corresponding to the first local domain name, and record, in an entry of forwarding information, the source IP address carried in the first domain name request packet and the first IP address determined from the reference information, so that the forwarding information includes an address pair including the source IP address and the first IP address.

For example, a local domain name having a correspondence with an IP address of each internal network computer in an internal network may be generated for the internal network computer, and the IP address of each internal network computer and the local domain name corresponding to the IP address are recorded in the reference information and are stored on the switch. When receiving the first domain name request packet, the switch may search the reference information for the first local domain name carried in the first domain name request packet. If the first local domain name is found in the reference information, the switch may determine that the first local domain name is authenticated, that is, the switch may determine that a sender (for example, the internal network computer i) of the first domain name request packet is secure. In this case, the switch may determine, as the first IP address, the IP address that is in the reference information and that is corresponding to the first local domain name, and record the source IP address carried in the first domain name request packet and the first IP address determined from the reference information in the entry of the forwarding information.

When finding, in the reference information, the first local domain name carried in the first domain name request packet, in addition to recording the source IP address carried in the first domain name request packet and the first IP address determined from the reference information in the entry of the forwarding information, the switch may further generate time duration information for each entry. Each piece of time duration information is used to indicate a valid time duration of a corresponding entry. The switch may record the time duration information of each entry in the entry, so that a correspondence exists between each entry and the time duration information corresponding to the entry. For example, when the forwarding information is an access control list, in order that a correspondence exists between each entry and the time duration information corresponding to the entry, each entry and the time duration information corresponding to the entry may be recorded in a same row or a same column of the access control list.

For each entry of the forwarding information, when the entry includes time duration information, the method 300 may further include: The switch determines whether a current time duration is greater than a valid time duration corresponding to the entry, where a timing start moment of the current time duration is a time of generating the entry; and if the current time duration is greater than the valid time duration corresponding to the entry, deletes the entry.

Specifically, the switch may manage, based on the time duration information included in the forwarding information, the entry recorded in the forwarding information.

For example, the switch may compare the current time duration with the valid time duration corresponding to the entry. The timing start moment of the current time duration is the time of generating the entry. For example, when adding an entry to the forwarding information, the switch may control a timer to start. After the timer starts, a current time duration is recorded.

If the current time duration is greater than the valid time duration corresponding to the entry, the switch may consider that the entry has expired. In this case, the switch may delete the expired entry recorded in the forwarding information, to manage the entry recorded in the forwarding information.

In addition, the switch may further update the stored reference information. For example, a local domain name that is corresponding to each IP address and that is recorded in the reference information may be periodically updated. For each IP address and the local domain name corresponding to the IP address, time duration information for updating the local domain name corresponding to the IP address may be recorded in the reference information.

For example, the reference information may be expressed as follows:

IP address  Local domain name  Time duration information
10.1.1.1  abc  300s
10.1.1.2  webs  300s
10.1.1.3  ftps  300s For example, for the IP address 10.1.1.1 in the reference information, the local domain name corresponding to the IP address 10.1.1.1 is abc before update, and the time duration information is used to indicate that the local domain name corresponding to the IP address 10.1.1.1 is to be updated after 300 seconds.

For example, after the first device (for example, the switch) receives the domain name request packet (for example, the first domain name request packet), and before the first device generates the entry of the forwarding information, the method 300 may further include: The switch obtains access control information, where the access control information is used to indicate an IP address of a device that requires access control. The switch determines, based on the access control information and the source IP address of the received domain name request packet, that the second device (for example, the internal network computer i) is the device that requires access control.

Specifically, after receiving the domain name request packet, the switch may first check the access control information, where the access control information records the IP address of the device that requires access control. For example, the access control information records a range of the IP address of the device that requires access control. After receiving the domain name request packet, and before performing authentication on the local domain name carried in the domain name request packet, the switch may first check the access control information, to determine whether the source IP address carried in the domain name request packet falls within a range, recorded in the access control information, of the source IP address. If the source IP address carried in the domain name request packet falls within the range, recorded in the access control information, of the source IP address, the switch needs to further determine whether the local domain name carried in the domain name request packet is authenticated. If the source IP address carried in the domain name request packet does not fall within the range, recorded in the access control information, of the source IP address, the switch only forwards the domain name request packet.

For example, when determining that the first local domain name carried in the first domain name request packet is authenticated, the switch may return the first IP address corresponding to the first local domain name to the internal network computer 1, so that the internal network computer 1 subsequently accesses data on a device whose IP address is the first IP address. In addition, the method 300 may further include: The first device (for example, the switch) generates a first domain name request response packet, where the first domain name request response packet carries the first IP address. The first device sends the first domain name request response packet to the second device (for example, the internal network computer 1).

For example, not all packets received by the switch may be domain name request packets. For example, a packet received by the switch may be a data request packet or a domain name request response packet. In this case, when receiving a packet (for example, a domain name request packet, a data request packet, or a domain name request response packet), the switch further needs to determine a type of the received packet (that is, the switch further needs to determine a type of the packet). Only when the switch determines that the received packet is a domain name request packet, the switch performs authentication on a sender of the domain name request packet by using a local domain name carried in the domain name request packet.

For example, the switch may determine the type of the received packet based on a protocol type carried in the packet. For example, when the protocol type carried in the packet received by the switch is the transmission control protocol (TCP), the switch may consider that the packet is a data request packet. When the protocol type carried in the packet received by the switch is the user datagram protocol (UDP), the switch may consider that the packet is a domain name request packet or a domain name request response packet.

In this case, the switch may further determine the type of the packet based on port information (for example, a port number) carried in the packet. For example, when the protocol type carried in the packet received by the switch is the UDP, if a destination port number carried in the packet is 53, the switch may consider that the packet is a domain name request packet sent to the DNS server. When the protocol type carried in the packet received by the switch is the UDP, if a source port number carried in the packet is 53, the switch may consider that the packet is a domain name request response packet from the DNS server.

It should be noted that the switch may alternatively determine the type of the packet only based on port information (for example, a port number) carried in the packet. For example, when a destination port number carried in the packet received by the switch is 53, the switch may consider that the packet is a domain name request packet sent to the DNS server. When a source port number carried in the packet received by the switch is 53, the switch may consider that the packet is a domain name request response packet from the DNS server.

For example, internal network computers may communicate with each other through the internal network, and each internal network computer may further access an external network (for example, Baidu). A data request packet sent by the internal network computer needs to be forwarded by the switch, regardless of access to the internal network or access to the external network. Based on the foregoing description of this embodiment of this application, when receiving the data request packet, the switch determines whether the forwarding information includes the source IP address and the destination IP address that are carried in the data request packet. Therefore, when the data request packet sent by the internal network computer is used to access the external network, if the forwarding information includes neither the source IP address nor the destination IP address that are carried in the data request packet, normal communication between the internal network computer and the external network is affected.

Therefore, to prevent the internal network from being attacked by a network intruder, and ensure the normal communication between the internal network computer and the external network, the forwarding information may further include an IP address of the internal network computer (for example, the source IP address) and an IP address of an external network server (for example, the destination IP address) to be accessed by the internal network computer.

For example, when the internal network computer 1 needs to access the external network, the internal network computer 1 first needs to send a domain name request packet (for example, a second domain name request packet) to a domain name resolution device (for example, the DNS server). A domain name carried in the second domain name request packet may be a domain name of the external network. For example, when the external network to be accessed by the internal network computer 1 is Baidu, the domain name carried in the second domain name request packet is www-.baidu.com, and a source IP address carried in the second domain name request packet is the IP address of the internal network computer 1. The second domain name request packet is first received by the switch, and the switch may determine that the domain name carried in the second domain name request packet is not a local domain name. In this case, the switch forwards the second domain name request packet to the DNS server.

The DNS server parses the second domain name request packet, to obtain an IP address of a Baidu server (for example, the IP address of the external network) that is requested by the second domain name request packet, and generates a second domain name request response packet. The second domain name request response packet carries the IP address of the Baidu server. Finally, the DNS server sends the second domain name request response packet to the internal network computer 1 through the switch.

When receiving the IP address of the Baidu server that is returned by the DNS server, the switch records an address pair including the source IP address and the IP address of the Baidu server in an entry of the forwarding information, so that the internal network computer 1 subsequently accesses Baidu.

It should be noted that, in this embodiment of this application, when a domain name request packet arrives at the switch, if the switch determines that a domain name carried in the obtained domain name request packet is a local domain name, the switch intercepts the domain name request packet, and determines whether the local domain name is authenticated. In other words, the switch does not forward the domain name request packet to a corresponding domain name resolution device.

It should be understood that the foregoing descriptions are merely intended to help a person skilled in the art better understand the embodiments of this application, but are not intended to limit the scope of the embodiments of this application. A person skilled in the art can apparently make various equivalent modifications or changes based on the foregoing examples. For example, some steps in the embodiments of the foregoing method may be unnecessary, some steps may be newly added, or any two or more of the foregoing embodiments may be combined. Such a modified, changed, or combined solution also falls within the scope of the embodiments of this application.

It should be further understood that, the foregoing descriptions of the embodiments of this application focus on a difference between the embodiments. For same or similar parts that are not mentioned, refer to each other. For brevity, details are not described herein.

It should be further understood that sequence numbers of the foregoing processes do not mean execution sequences. The execution sequences of the processes should be determined based on functions and internal logic of the processes, and should not constitute any limitation on implementation processes of the embodiments of this application.

It should be understood that division of manners, cases, types, and embodiments in the embodiments of this application are merely for ease of description, but should not constitute any special limitation, and features in various manners, types, cases, and embodiments may be combined when there is no contradiction.

It should be further understood that in the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

Figure 4:
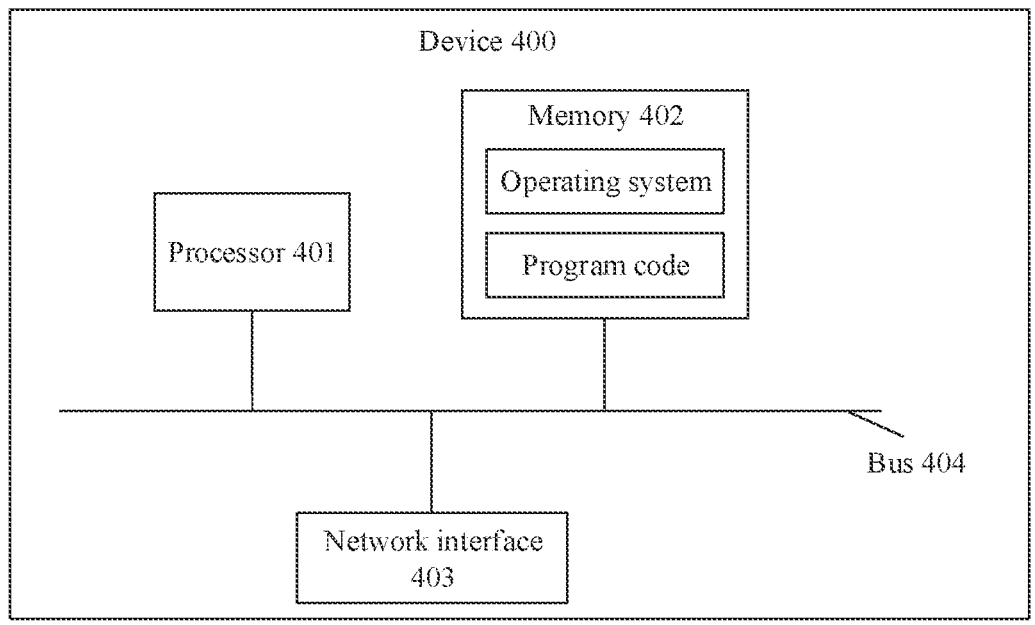
FIG. 4 is a schematic block diagram of a first device according to an embodiment of this application.

FIG. 4 is a schematic structural diagram of a network access control device 400 according to this application.

Optionally, the network access control device with a structure shown in FIG. 4 is the first device in FIG. 2 or FIG. 3. The first device includes at least one processor 401, a memory 402, and a network interface 403. The processor 401, the memory 402, and the network interface 403 are connected to each other through a bus 404.

The at least one processor 401 may be one or more CPUs. The CPU may be a single-core CPU, or may be a multi-core CPU.

The memory 402 includes but is not limited to a random access memory (RAM), a read-only memory (ROM), an erasable programmable read-only memory (EPROM or a flash memory), or a portable compact disc read-only memory (CD-ROM). The memory 402 stores code of an operating system and program code for implementing the method provided in this application.

The network interface 403 may be a wired interface, for example, a fiber distributed data interface (FDDI) or a gigabit Ethernet (GE) interface. Alternatively, the network interface 403 may be a wireless interface. The network interface 403 is configured to receive a first domain name request packet sent by a second device. The first domain name request packet carries a source internet protocol IP address and a first local domain name, and the first local domain name is used to indicate a device other than the second device in an internal network.

The processor 401 is configured to read the program code stored in the memory 402, so that the first device (optionally, the processor 401 in the first device) is enabled to perform the following operation: determining whether the first local domain name is authenticated. If the first local domain name is authenticated, the first device is further configured to generate an entry of forwarding information. The entry includes an address pair including the source IP address and a first IP address corresponding to the first local domain name.

The network interface 403 is further configured to: receive a data request packet sent by the second device, where the data request packet carries the source IP address and a destination IP address; and determine, based on the source IP address, the destination IP address, and the forwarding information, whether to forward the data request packet, where the data request packet is used to access the internal network.

Optionally, the processor 401 is further configured to: determine whether a structure of a character string of the first local domain name meets a preset naming rule; and if the structure of the character string of the first local domain name meets the preset naming rule, determine that the first local domain name is authenticated.

Optionally, the first IP address is truncated from the character string of the first local domain name according to the preset naming rule.

Optionally, the processor 401 is further configured to: determine whether stored reference information includes the first local domain name, where the reference information includes a plurality of local domain names and a plurality of IP addresses, and the plurality of local domain names and the plurality of IP addresses are in a one-to-one correspondence; and if the reference information includes the first local domain name, determine that the first local domain name is authenticated, where the first IP address is an IP address that is in the reference information and that is corresponding to the first local domain name.

Optionally, the first device is further configured to generate a first domain name request response packet. The first domain name request response packet carries the first IP address.

The network interface 403 is further configured to send the first domain name request response packet to the second device.

Optionally, each entry of the forwarding information further includes time duration information, and the time duration information is used to indicate a valid time duration of the entry. For each entry, the first device is further configured to: determine whether a current time duration is greater than a valid time duration corresponding to the address pair, where a timing start moment of the current time duration is a time of generating the entry; and if the current time duration is greater than the valid time duration corresponding to the address pair, delete the entry.

Optionally, the first device is further configured to: determine whether the forwarding information includes an address pair including the source IP address and the destination IP address; and if the forwarding information includes the address pair including the source IP address and the destination IP address, forward the data request packet; or if the forwarding information does not include the address pair including the source IP address and the destination IP address, send the data request packet to a deception system in the internal network, or discard the data request packet.

Optionally, the network interface 403 is further configured to receive a second domain name request packet sent by the second device. The second domain name request packet carries the source IP address and a domain name of an external network.

The network interface 403 is further configured to send the second domain name request packet to a domain name resolution device.

Optionally, the network interface 403 is further configured to receive a second domain name request response packet returned by the domain name resolution device. The second domain name request response packet carries an IP address of the external network.

The network interface 403 is further configured to send the second domain name request response packet to the second device.

Optionally, the first device is further configured to generate an entry of the forwarding information based on the domain name of the external network. The entry includes an address pair including the source IP address and the IP address of the external network.

Optionally, the first device is further configured to: obtain access control information, where the access control information is used to indicate an IP address of a device that requires access control; and determine, based on the access control information and the source IP address of the first domain name request packet, that the second device is the device that requires access control.

For details of a working process of the network access control device 300 shown in FIG. 4, refer to the description in the embodiments shown in FIG. 2 and FIG. 3. Details are not described herein again.

Figure 5:
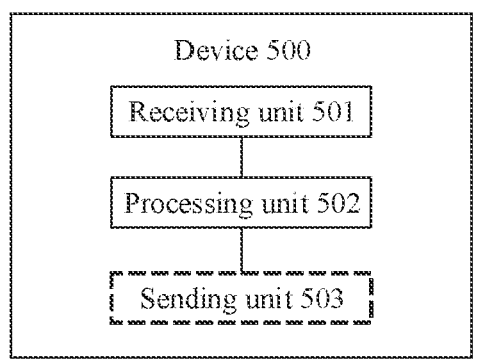
FIG. 5 is another schematic block diagram of a first device according to an embodiment of this application.

FIG. 5 is a schematic structural diagram of another network access control device 500 according to this application. Optionally, the network access control device with a structure shown in FIG. 5 is the first device in FIG. 2 or FIG. 3. The first device includes a receiving unit 501, a processing unit 502, and a sending unit 503.

The receiving unit 501 is configured to receive a first domain name request packet sent by a second device. The first domain name request packet carries a source internet protocol IP address and a first local domain name, and the first local domain name is used to indicate a device other than the second device in an internal network.

The processing unit 502 is configured to determine whether the first local domain name is authenticated.

The processing unit 502 is further configured to, if the first local domain name is authenticated, generate an entry of forwarding information. The entry includes an address pair including the source IP address and a first IP address corresponding to the first local domain name.

The receiving unit 501 is further configured to receive a data request packet sent by the second device. The data request packet carries the source IP address and a destination IP address.

The processing unit 502 is further configured to determine, based on the source IP address, the destination IP address, and the forwarding information, whether to forward the data request packet, where the data request packet is used to access the internal network.

Optionally, the processing unit 502 is further configured to: determine whether a structure of a character string of the first local domain name meets a preset naming rule; and if the structure of the character string of the first local domain name meets the preset naming rule, determine that the first local domain name is authenticated.

Optionally, the first IP address is truncated from the character string of the first local domain name according to the preset naming rule.

Optionally, the processing unit 502 is further configured to: determine whether stored reference information includes the first local domain name, where the reference information includes a plurality of local domain names and a plurality of IP addresses, and the plurality of local domain names and the plurality of IP addresses are in a one-to-one correspondence; and if the reference information includes the first local domain name, determine that the first local domain name is authenticated, where the first IP address is an IP address that is in the reference information and that is corresponding to the first local domain name.

Optionally, the processing unit 502 is further configured to generate a first domain name request response packet. The first domain name request response packet carries the first IP address.

The sending unit 503 is configured to send the first domain name request response packet to the second device.

Optionally, each entry of the forwarding information further includes time duration information, and the time duration information is used to indicate a valid time duration of the entry. For each entry, the processing unit 502 is further configured to: determine whether a current time duration is greater than a valid time duration corresponding to the address pair, where a timing start moment of the current time duration is a time of generating the entry; and if the current time duration is greater than the valid time duration corresponding to the address pair, delete the entry.

Optionally, the processing unit 502 is further configured to: determine whether the forwarding information includes an address pair including the source IP address and the destination IP address; and if the forwarding information includes the address pair including the source IP address and the destination IP address, forward the data request packet; or if the forwarding information does not include the address pair including the source IP address and the destination IP address, send the data request packet to a deception system in the internal network, or discard the data request packet.

Optionally, the receiving unit 501 is further configured to receive a second domain name request packet sent by the second device. The second domain name request packet carries the source IP address and a domain name of an external network.

The sending unit 503 is further configured to send the second domain name request packet to a domain name resolution device.

Optionally, the receiving unit 501 is further configured to receive a second domain name request response packet returned by the domain name resolution device. The second domain name request response packet carries an IP address of the external network.

The sending unit 503 is configured to send the second domain name request response packet to the second device.

Optionally, the processing unit 502 is further configured to generate an entry of the forwarding information based on the domain name of the external network. The entry includes an address pair including the source IP address and the IP address of the external network.

Optionally, the processing unit 502 is further configured to: obtain access control information, where the access control information is used to indicate an IP address of a device that requires access control; and determine, based on the access control information and the source IP address of the first domain name request packet, that the second device is the device that requires access control.

The described apparatus embodiment in FIG. 5 is merely an example. For example, division into units is merely logical function division and may be other division in an actual implementation. For example, a plurality of units or components may be combined or integrated into another system, or some features may be ignored or not performed. Functional units in the embodiments of this application may be integrated into one processing unit, or each of the units may exist alone physically, or two or more units may be integrated into one unit. The foregoing units in FIG. 5 may be implemented in a form of hardware, or may be implemented in a form of a software functional unit. For example, when implemented in the form of software, the receiving unit 501, the processing unit 502, and the sending unit 503 may be implemented by software function modules generated after the CPU in FIG. 4 reads the program code stored in the memory. Alternatively, the foregoing units in FIG. 5 may be separately implemented by different hardware in the first device. For example, the receiving unit 501 and the sending unit 503 are implemented by the network interface 403 in FIG. 4, and the processing unit 502 is implemented by the processor 401 in FIG. 4, or implemented by a programmable device such as a field-programmable gate array (FPGA) or a coprocessor. It is clear that the foregoing function modules may alternatively be implemented by a combination of software and hardware. For example, the receiving unit 501 and the sending unit 503 are implemented by a hardware programmable device, and the processing unit 502 is implemented by the software function module generated after the CPU reads the program code stored in the memory. All or some of the foregoing embodiments may be implemented by software, hardware, firmware, or any combination thereof. When software is used to implement the embodiments, all or some of the foregoing embodiments may be implemented in a form of a computer program product. The computer program product includes one or more computer instructions or computer programs. When the computer instruction or the computer program is loaded and executed on a computer, the procedure or function according to the embodiments of this application is all or partially generated. The computer may be a general-purpose computer, a special-purpose computer, a computer network, or another programmable apparatus. The computer instruction may be stored in a computer-readable storage medium or may be transmitted from one computer-readable storage medium to another computer-readable storage medium. For example, the computer instruction may be transmitted from one website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable medium sets. The usable medium may be a magnetic medium (for example, a floppy disk, a hard disk, or a magnetic tape), an optical medium (for example, a DVD), or a semiconductor medium. The semiconductor medium may be a solid-state drive.

For details of a working process of the network access control device 500 shown in FIG. 5, refer to the description in the embodiments shown in FIG. 2 and FIG. 3. Details are not described herein again.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    receiving, by a first device in an internal network, a first domain name request packet sent by a second device in the internal network, wherein the first domain name request packet carries a source internet protocol (IP) address and a first local domain name, and the first local domain name indicates a device other than the second device in the internal network, the first device being a forwarding device in the internal network;
    determining, by the first device, whether the first local domain name is authenticated;
    when the first local domain name is authenticated, generating, by the first device, a first entry in forwarding information, wherein the first entry comprises a first address pair comprising the source IP address and a first IP address corresponding to the first local domain name, and the forwarding information comprises one or more entries each of which includes a corresponding address pair;
    receiving, by the first device, a data request packet sent by the second device, wherein the data request packet carries the source IP address and a destination IP address; and
    determining, by the first device based on the source IP address, the destination IP address and the forwarding information, whether to forward the data request packet, wherein the data request packet requests to access the internal network.

2. The method according to claim 1, wherein determining whether the first local domain name is authenticated comprises:
    determining, by the first device, whether a structure of a character string of the first local domain name meets a preset naming rule; and
    when the structure of the character string of the first local domain name meets the preset naming rule, determining, by the first device, that the first local domain name is authenticated.

3. The method according to claim 2, wherein the first IP address is obtained by truncating from the character string of the first local domain name according to the preset naming rule.

4. The method according to claim 1, wherein determining whether the first local domain name is authenticated comprises:
    determining, by the first device, whether stored reference information comprises the first local domain name, wherein the stored reference information comprises a plurality of local domain names and a plurality of IP addresses, and the plurality of local domain names and the plurality of IP addresses are in a one-to-one correspondence; and when the stored reference information comprises the first local domain name, determining, by the first device, that the first local domain name is authenticated, wherein the first IP address is comprised in the stored reference information.

5. The method according to claim 1, wherein when the first local domain name is authenticated, the method further comprises:

generating, by the first device, a first domain name request response packet, wherein the first domain name request response packet carries the first IP address; and sending, by the first device, the first domain name request response packet to the second device.

6. The method according to claim 1, wherein each entry of the forwarding information further comprises time duration information indicating a valid time duration of a corresponding entry, and the method further comprises:

for each entry, determining, by the first device, whether a current time duration is greater than the valid time duration of the corresponding entry, wherein a timing start moment of the current time duration is a time when the corresponding entry is generated; and when the current time duration is greater than the valid time duration of the corresponding entry, deleting the corresponding entry.

7. The method according to claim 1, wherein determining, by the first device based on the source IP address, the destination IP address and the forwarding information, whether to forward the data request packet comprises:

determining, by the first device, whether the forwarding information comprises an address pair comprising the source IP address and the destination IP address; and when the forwarding information comprises the address pair comprising the source IP address and the destination IP address, forwarding, by the first device, the data request packet; or when the forwarding information does not comprise the address pair comprising the source IP address and the destination IP address, sending, by the first device, the data request packet to a deception system in the internal network, or discarding, by the first device, the data request packet.

8. The method according to claim 1, wherein the method further comprises:

receiving, by the first device, a second domain name request packet sent by the second device, wherein the second domain name request packet carries the source IP address and a domain name of an external network; and sending, by the first device, the second domain name request packet to a domain name resolution device.

9. The method according to claim 8, wherein the method further comprises:

receiving, by the first device, a second domain name request response packet returned by the domain name resolution device, wherein the second domain name request response packet carries an IP address of the external network; and sending, by the first device, the second domain name request response packet to the second device.

10. The method according to claim 9, wherein the method further comprises:

generating, by the first device, a second entry in the forwarding information based on the domain name of the external network, wherein the second entry comprises a second address pair comprising the source IP address and the IP address of the external network.

11. The method according to claim 10, wherein after receiving the second domain name request packet, and before generating the second entry of the forwarding information, the method further comprises:

obtaining, by the first device, access control information, wherein the access control information indicates an IP address of a device that requires access control; and determining, by the first device based on the access control information and the source IP address of the second domain name request packet, that the second device is the device that requires access control.

12. The method according to claim 1, wherein after receiving the first domain name request packet, and before generating the first entry of the forwarding information, the method further comprises:

obtaining, by the first device, access control information, wherein the access control information indicates an IP address of a device that requires access control; and determining, by the first device based on the access control information and the source IP address of the first domain name request packet, that the second device is the device that requires access control.

13. A first device comprising:

a memory, configured to store a program code, wherein the memory is connected to at least one processor, and when the program code is executed by the at least one processor, the first device is caused to:

receive a first domain name request packet sent by a second device in an internal network, wherein the first domain name request packet carries a source internet protocol (IP) address and a first local domain name, and the first local domain name indicates a device other than the second device in the internal network, the first device being a forwarding device in the internal network;

determine whether the first local domain name is authenticated;

when the first local domain name is authenticated, generate a first entry in forwarding information, wherein the first entry comprises a first address pair comprising the source IP address and a first IP address corresponding to the first local domain name, and the forwarding information comprises one or more entries each of which includes a corresponding address pair;

receive a data request packet sent by the second device, wherein the data request packet carries the source IP address and a destination IP address; and determine, based on the source IP address, the destination IP address, and the forwarding information, whether to forward the data request packet, wherein the data request packet requests to access the internal network.

14. The first device according to claim 13, wherein the first device is further caused to:

determine whether a structure of a character string of the first local domain name meets a preset naming rule; and when the structure of the character string of the first local domain name meets the preset naming rule, determine that the first local domain name is authenticated.

15. The first device according to claim 14, wherein the first IP address is obtained by truncating from the character string of the first local domain name according to the preset naming rule.

16. The first device according to claim 13, wherein the first device is further caused to:

determine whether stored reference information comprises the first local domain name, wherein the stored reference information comprises a plurality of local domain names and a plurality of IP addresses, and the plurality of local domain names and the plurality of IP addresses are in a one-to-one correspondence; and when the stored reference information comprises the first local domain name, determine that the first local domain name is authenticated, wherein the first IP address is comprised in the stored reference information.

17. The first device according to claim 13, wherein the first device is further caused to:

generate a first domain name request response packet, wherein the first domain name request response packet carries the first IP address; and send the first domain name request response packet to the second device.

18. The first device according to claim 13, wherein each entry of the forwarding information further comprises time duration information indicating a valid time duration of a corresponding entry, and the first device is further caused to:

for each entry, determine whether a current time duration is greater than the valid time duration of the corresponding entry, wherein a timing start moment of the current time duration is a time when the corresponding entry is generated; and when the current time duration is greater than the valid time duration of the corresponding entry, delete the corresponding entry.

19. The first device according to claim 13, wherein the first device is further caused to:

determine whether the forwarding information comprises an address pair comprising the source IP address and the destination IP address; and when the forwarding information comprises the address pair comprising the source IP address and the destination IP address, forward the data request packet; or when the forwarding information does not comprise the address pair comprising the source IP address and the destination IP address, send the data request packet to a deception system in the internal network, or discard the data request packet.

20. A non-transitory computer-readable storage medium, wherein the non-transitory computer-readable storage medium stores instructions, and the instructions, when executed by at least one processor, cause a first device to perform:

receiving a first domain name request packet sent by a second device in an internal network, wherein the first domain name request packet carries a source internet protocol (IP) address and a first local domain name, and the first local domain name indicates a device other than the second device in the internal network, the first device being a forwarding device in the internal network;

determining whether the first local domain name is authenticated;

when the first local domain name is authenticated, generating an entry in forwarding information, wherein the entry comprises an address pair comprising the source IP address and a first IP address corresponding to the first local domain name, and the forwarding information comprises one or more entries each of which includes a corresponding address pair;

receiving a data request packet sent by the second device, wherein the data request packet carries the source IP address and a destination IP address; and determining, based on the source IP address, the destination IP address and the forwarding information, whether to forward the data request packet, wherein the data request packet requests to access the internal network.

* * * * *